(12) United States Patent
Li et al.

(10) Patent No.: US 11,902,340 B2
(45) Date of Patent: Feb. 13, 2024

(54) DATA PROCESSING METHOD, APPARATUS, ELECTRONIC DEVICE AND STORAGE MEDIUM

(71) Applicant: BEIJING BYTEDANCE NETWORK TECHNOLOGY CO., LTD., Beijing (CN)

(72) Inventors: Shangshu Li, Beijing (CN); Yi Duan, Beijing (CN); Rui Yang, Beijing (CN)

(73) Assignee: BEIJING BYTEDANCE NETWORK TECHNOLOGY CO., LTD.

( * ) Notice: Subject to any disclaimer, the term of this patent is extended or adjusted under 35 U.S.C. 154(b) by 0 days.

(21) Appl. No.: 17/726,231

(22) Filed: Apr. 21, 2022

(65) Prior Publication Data

US 2023/0156050 A1 May 18, 2023

(30) Foreign Application Priority Data

Nov. 17, 2021 (CN) .......................... 202111363504.6

(51) Int. Cl.
  *G06F 15/16* (2006.01)
  *H04L 65/1095* (2022.01)
  *H04L 65/403* (2022.01)
  *G06F 3/0482* (2013.01)

(52) U.S. Cl.
  CPC ........ *H04L 65/1095* (2022.05); *G06F 3/0482* (2013.01); *H04L 65/403* (2013.01)

(58) Field of Classification Search
  CPC .. H04L 65/1095; H04L 65/403; G06F 3/0482
  USPC ....................................................... 709/227
  See application file for complete search history.

(56) References Cited

U.S. PATENT DOCUMENTS

| | | | |
|---|---|---|---|
| 10,523,625 B1 * | 12/2019 | Allen | H04L 51/52 |
| 11,539,647 B1 * | 12/2022 | Tai | G06F 16/735 |
| 11,604,622 B1 * | 3/2023 | Guo | G10L 25/18 |
| 2012/0173625 A1 * | 7/2012 | Berger | G06Q 50/01 |
| | | | 709/204 |
| 2013/0151633 A1 * | 6/2013 | Hazarika | H04L 51/52 |
| | | | 709/206 |
| 2016/0088032 A1 * | 3/2016 | Corbin | H04L 67/10 |
| | | | 715/716 |
| 2021/0168473 A1 | 6/2021 | Li | |
| 2022/0116147 A1 * | 4/2022 | Hou | H04L 5/0055 |
| 2022/0129143 A1 * | 4/2022 | Carter | G06F 3/0482 |
| 2022/0385618 A1 * | 12/2022 | Liao | H04L 51/48 |

FOREIGN PATENT DOCUMENTS

| | | | | |
|---|---|---|---|---|
| CN | 103329152 A | * | 9/2013 | ........... G06F 3/0484 |
| CN | 103593342 A | | 2/2014 | |
| CN | 106775328 A | | 5/2017 | |

(Continued)

*Primary Examiner* — Moustafa M Meky
*Assistant Examiner* — Thorne E Waugh

(57) ABSTRACT

Embodiments of the present disclosure provide a data processing method, apparatus, electronic device and storage medium. The method including: if it is detected that an operation behavior on a target display page is a sharing operation behavior, determining target display information of at least one candidate sharer; wherein, user types corresponding to the at least one candidate sharer include a "to-be-followed-back" type; displaying the at least one candidate sharer on a target sharing interface corresponding to the target display page based on the target display information.

15 Claims, 5 Drawing Sheets if it is detected that an operation behavior on a target display page is a sharing operation behavior, determining target display information of at least one candidate sharer — S110 displaying at least one candidate sharer on a target sharing interface corresponding to the target display page based on the target display information — S120

(56) References Cited

FOREIGN PATENT DOCUMENTS

| CN | 108667633 | A | | 10/2018 | |
|----|-----------|---|---|---------|---|
| CN | 110083771 | A | | 8/2019 | |
| CN | 110493886 | A | * | 11/2019 | ............. H04L 63/08 |
| CN | 110868639 | A | | 3/2020 | |
| CN | 111400596 | A | * | 7/2020 | |
| CN | 112445389 | A | * | 3/2021 | |
| CN | 112491694 | A | * | 3/2021 | ......... G06Q 30/0251 |
| CN | 113300944 | A | | 8/2021 | |
| CN | 113742601 | A | * | 12/2021 | |
| CN | 114168220 | A | * | 3/2022 | |
| CN | 113595855 | B | * | 4/2022 | ............ H04L 51/42 |
| CN | 114666643 | A | * | 6/2022 | |
| EP | 4113936 | A1 | * | 1/2023 | ........... H04L 65/402 |
| WO | WO-2016064079 | A1 | * | 4/2016 | ............. G06Q 50/30 |

* cited by examiner

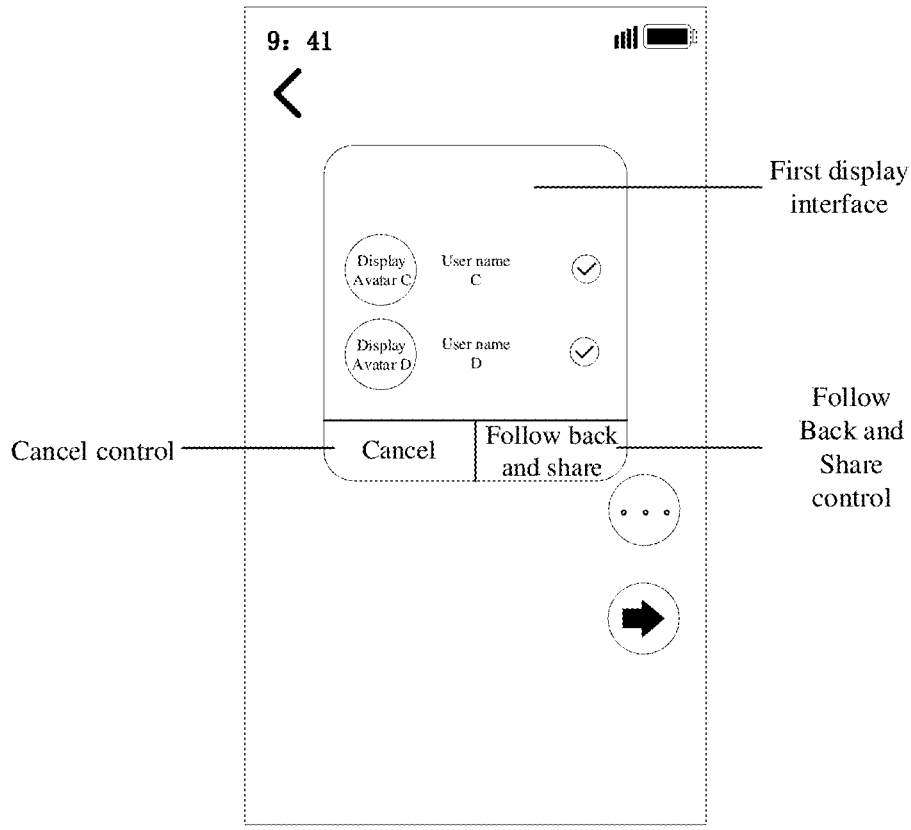

Fig. 5

| |
|---|
| if it is detected that an operation behavior on the target display page is a sharing operation behavior, determining target display information of at least one candidate sharer ~ S310 |
| displaying the display avatars of the candidate sharers whose user type is the mutual type, and the display avatars and display sources of the candidate sharers whose user type is the "to-be-followed-back" type on a target sharing interface corresponding to the target display page according to the second layout information ~ S320 |
| if the target sharing interface is generated based on the second sharing operation behavior, when it is detected that a user type control triggered is the "to-be-followed-back" type control, following back the corresponding target sharer, and sending target data for sharing corresponding to the target display page to the target sharer ~ S330 |

Fig. 6

DATA PROCESSING METHOD, APPARATUS, ELECTRONIC DEVICE AND STORAGE MEDIUM

CROSS-REFERENCE TO RELATED APPLICATIONS

The present disclosure is based on and claims priority to Chinese Patent Application No. 202111363504.6 filed on Nov. 17, 2021, the disclosure of which is incorporated by reference herein in its entirety.

TECHNICAL FIELD

Embodiments of this disclosure relate to the technical field of computers, and in particular to a data processing method, apparatus, electronic device and storage medium.

BACKGROUND

At present, many applications have certain social attributes, and users can use corresponding functions provided by these applications to interact with other users.

SUMMARY

The embodiments of the present disclosure provide a data processing method, apparatus, electronic device, and storage medium.

According to an aspect of the disclosure, embodiments of the present disclosure provide a data processing method, the method comprising:
  determining target display information of at least one candidate sharer, if it is detected that an operation behavior on a target display page is a sharing operation behavior; wherein, user types corresponding to the at least one candidate sharer include a "to-be-followed-back" type;
  displaying the at least one candidate sharer on a target sharing interface corresponding to the target display page based on the target display information.

According to an aspect of the disclosure, embodiments of the present disclosure provide a data processing apparatus, the apparatus comprising:
  a display information determination module for, determining target display information of at least one candidate sharer, if it is detected that an operation behavior on a target display page is a sharing operation behavior; wherein, user types corresponding to the at least one candidate sharer include a "to-be-followed-back" type;
  a display interface determination module for, based on the target display information, displaying the at least one candidate sharer on a target sharing interface corresponding to the target display page.

According to an aspect of the disclosure, embodiments of the present disclosure provide an electronic device, the electronic device comprising:
  one or more processors;
  a storage device for storing one or more programs, which when executed by the one or more processors, cause the one or more processors to implement the data processing method according to any one of the embodiments of the present disclosure.

According to an aspect of the disclosure, embodiments of the present disclosure further provide a non-transitory storage medium containing computer executable instructions for executing the data processing method according to any one of the embodiments of the present disclosure when executed by a computer processor.

BRIEF DESCRIPTION OF THE DRAWINGS

The above and other features, advantages, and aspects of the embodiments of the present disclosure will become more apparent from the following detailed description with reference to the drawings. Throughout the drawings, the same or similar reference signs indicate the same or similar elements. It should be understood that the drawings are schematic and the components and elements are not necessarily drawn to scale.

FIG. 5 is a first display interface corresponding to the first sharing operation behavior provided in some embodiments of the present disclosure;

FIG. 6 is a flowchart of a data processing method provided in some embodiments of the present disclosure;

DETAILED DESCRIPTION

Figure 1:
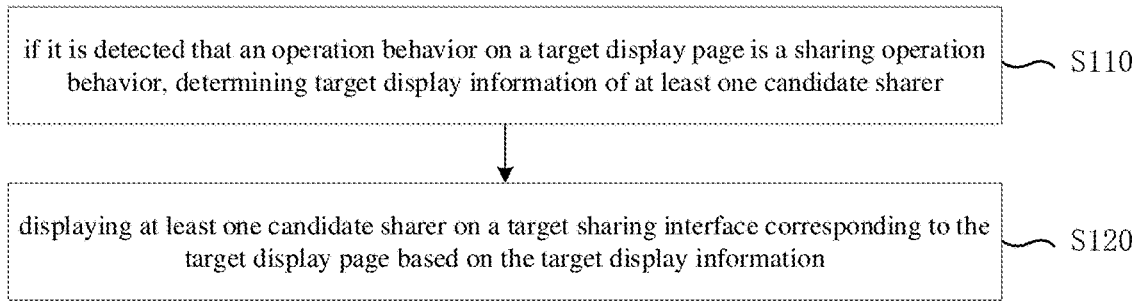
FIG. 1 is a flowchart of a data processing method provided in some embodiments of the present disclosure.

Exemplary embodiments of the present disclosure will now be described below in more detail with reference to the accompanying drawings. Although some embodiments of the present disclosure are shown in the drawings, it should be understood that the present disclosure can be implemented in various forms, and should not be construed as being limited to the embodiments set forth herein. On the contrary, these embodiments are provided for a more thorough and complete understanding of the present disclosure. It should be understood that the drawings and embodiments of the present disclosure are only used for exemplary purposes, and are not used to limit the scope of protection of the present disclosure.

It should be understood that the various steps described in the method embodiments of the present disclosure may be executed in a different order, and/or executed in parallel. In addition, the method embodiments may include additional steps and/or some of the illustrated steps may be omitted. The scope of this disclosure is not limited in this regard.

The term "including" and its variants as used herein is an open-ended mode expression, that is, "including but not limited to". The term "based on" means "based at least in part on". The term "one embodiment" means "at least one embodiment"; The term "another embodiment" means "at least one additional embodiment"; The term "some embodiments" means "at least some embodiments". Related definitions of other terms will be given in the following description.

It should be noted that the concepts of "first" and "second" mentioned in the present disclosure are only used to distinguish different devices, modules or units, and are not used to limit the order of functions performed by these devices, modules or units, or interdependence therebetween.

It should be noted that the modifications of "a" and "a plurality of" mentioned in the present disclosure are illustrative and not restrictive, and those skilled in the art should understand that unless otherwise clearly indicated in the context, they should be understood as "one or more".

As described above, many applications have certain social attributes, and users can use corresponding functions provided by these applications to interact with other users. However, in the process of interaction, a user finding something of interest can only interact with mutuals. That is, there are some cases in the existing applications that cannot enable a user to interact with some "related" users, resulting in limitations on interaction in the applications and the weak performance of friend mining, which will in turn affect the user activeness and popularization of a product.

FIG. 1 is a flowchart of a data processing method provided in some embodiments of the present disclosure. This embodiment is applicable to a situation where a user who performs a sharing operation shares a content of an application to "to-be-followed-back" users. This method may be executed by a data processing apparatus, which may be implemented in the form of software and/or hardware, wherein the hardware may be an electronic device, such as a mobile terminal, a PC terminal, or a server, or the like.

Before introducing the technical scheme, an exemplary description of the application scenario will be given. This technical scheme can be applied to any application that can realize content sharing. For example, users may want to share a content provided on a client with other users according to their own intent. Other users can be on-site users of the application or off-site users of the application. On-site users can be understood as users who have registered with the application. Off-site users are mainly users who have registered with other applications that are associated with the application in question. It should also be noted that on-site users may be followers or non-followers of the client. If a user finds a content of interest from multimedia information provided by the application and wishes to share the content with more users, according to the technical solution of this embodiment, the content can not only be shared with mutuals, but also "to-be-followed-back" users. Wherein, a "to-be-followed-back" user can be understood as another user who is a follower of the user, but is not followed back by the user. In this way, an effect of expanding the scope of interaction involved in the user's sharing operation can be achieved. Furthermore, an effect of application promotion can be achieved.

As shown in FIG. 1, the method of this embodiment includes:

S110: if it is detected that an operation behavior on a target display page is a sharing operation behavior, determining target display information of at least one candidate sharer.

Wherein, the target display page may be a page on the client providing application services for the user. For example, in an application providing multimedia information (such as a video clip application, or a livestream application on a mobile terminal), a page that displays multimedia contents is a target display page; in an application that provides news information, a page that displays pictures and text content is a target display page. Further, a variety of corresponding controls can be developed according to different business logic in the target display page to provide the user with diversified functions. For example, in an application with social interaction attributes, a Share control and a Comment control can be developed in the corresponding target display page. Based on this, when a user finds a content of interest in the application, he/she can use the Share control to share this content with other users, or comment on this content.

In this embodiment, in addition to browsing the corresponding content on the target display page, the user can also perform various types of operation behaviors, such as a sharing operation behavior or a comment operation behavior. Wherein, the sharing operation behavior refers to a sharing operation performed by the user on the target display page. When the client detects a sharing operation behavior on the target display page, the business logic for the sharing function deployed on the client in advance can be triggered.

For example, if a Share control is developed in the target display page, the behavior of a user clicking the Share control is a sharing operation behavior. Correspondingly, when the application detects that the user triggers the Share control, it will generate a corresponding sharing instruction and trigger the subsequent business logic based on the instruction. Those skilled in the art should understand that, for different types of clients, the user can perform a sharing operation on a target display page through a variety of methods, such as a touch operation or a slide operation, and the client can detect and provide feedback to the above sharing operation behavior in different manners. It is not specifically limited in the embodiment of the present disclosure.

Further, when a sharing operation behavior on a trigger target display page is detected, target display information can be determined for at least one candidate sharer. Wherein, the candidate sharers may be all mutuals on the client's friends list, or "to-be-followed-back" users who are not on the friends list.

Specifically, the user types of the candidate sharers may include only a mutual type, only a "to-be-followed-back" type, or both of these types. Of course, each user corresponds to only one user type. The mutual type refers to a type of users who follow the user performing the sharing operation and is also followed by the user performing the sharing operation, while the "to-be-followed-back" type refers to those users who are followers of the sharing user, but are not followed back by the sharing user. For example, in an application with social interaction attributes, the users who are followers of user A and are also followed back by user A are users of the mutual type, and users who are followers of user A, but are not followed back by user A are users of the "to-be-followed-back" type.

It should be noted that, in the technical solution of the present disclosure, the case where types of candidate sharers are only the mutual type is not concerned, and only the data processing of candidate sharers including the "to-be-followed-back" user type will be discussed.

In this embodiment, when the user performs a sharing operation behavior on a target display page, in order to expand the scope of user interaction, at least one user of the "to-be-followed-back" type is included in the determined candidate sharers. It can be understood that the candidate sharers determined by the client can be composed of some mutuals and some "to-be-followed-back" users, or completely composed of "to-be-followed-back" users. Those skilled in the art should understand that the rules for determining different types of candidate sharers can be set according to actual needs, and are not specifically limited in the embodiments of the present disclosure.

Generally, the determined number of candidate sharers can match the number of the mutuals on the friends list. For example, if the number of friends reaches a preset number threshold, no "to-be-followed-back" users can be displayed. Of course, in order to realize application promotion or for the convenience of applying to be a friend, it is also possible to specify a user number for each of the two user types, and then determine mutuals and "to-be-followed-back" users in accordance with the user numbers, such as 10 users of the mutual type, and 10 users of the "to-be-followed-back" type. In this case, corresponding candidate sharers may be determined according to the intimacy or degree of association, within a preset time period, between respective users and the user of the client. The advantage of the above method is that, if a user registers with the application for the first time or uses the application for less than a certain number of days, in order to improve user stickiness and retain users as much as possible, it can be determined to display users of the "to-be-followed-back" type on the sharing interface.

In this embodiment, when determining the candidate sharers, corresponding target display information can also be determined.

Wherein, the target display information may be information related to the candidate sharers that will be displayed by the client, such as the avatars and names of the candidate sharers. Since the types of the candidate sharers include at least the "to-be-followed-back" user type, the target display information may also be preset layout information corresponding to the "to-be-followed-back" user type, that is, information about how to arrange the candidate sharers. In actual application procedures, the target display information corresponding to the mutual type and the target display information corresponding to the "to-be-followed-back" user type can be set in different manners according to actual needs. The determined target display information of the candidate sharers can be invoked in the process of triggering the subsequent business logic by the client.

S120: displaying at least one candidate sharer on a target sharing interface corresponding to the target display page based on the target display information.

Wherein, the target sharing interface is an interface for displaying various candidate sharers. Based on this interface, the users who will receive the data to be shared can be determined. It can be understood that based on the user's touch operation on the target sharing interface, the client can realize a variety of corresponding functions, for example, determining the content to be shared based on the touch operation of the user performing the sharing operation, selecting target users for receiving the content to be shared from the candidate sharers, and determining text information sent by the user to a target user during the content sharing process.

In this embodiment, the target sharing interface is used to display at least one candidate sharer, and the specific content and layout mode of the interface are determined based on the target display information. For example, when user A performs a sharing operation on the target display page, and if the candidate sharers include mutual B and "to-be-followed-back" user C, the client can respond to the sharing operation behavior and determine corresponding target display information for the two users. Further, a target sharing interface pops up from the target display page. Based on the target display information of mutual B, the avatar and name of user B are displayed on the interface in a layout mode corresponding to user B. Also, based on the target display information of "to-be-followed-back" user C, the avatar and name of user C are displayed on the interface in a layout mode corresponding to user C. On this basis, user A can perform a Touch to Select operation on the target sharing interface to determine a target user who will receive the content to be shared from user B and user C.

In this embodiment, the target sharing interface can be displayed to partially cover the target display page, or a new interface can be popped up to fully cover the target display page.

According to the technical scheme of this embodiment, if it is detected that an operation behavior on the target display page is a sharing operation behavior, target display information of at least one candidate sharer is determined, that is, when a user performs a sharing operation, display information of at least one "to-be-followed-back" user who is a follower of the user, but is not followed back by the user is determined; further, based on the target display information, the at least one candidate sharer is displayed on a target sharing interface corresponding to the target display page, to provide a way for the user performing the sharing operation to share a content with a "to-be-followed-back" user, so that the business logic of the sharing function is improved, and scope of interaction corresponding to the user sharing operation is expanded, which is helpful to improve the user activeness and use experience of the product.

Figure 2:
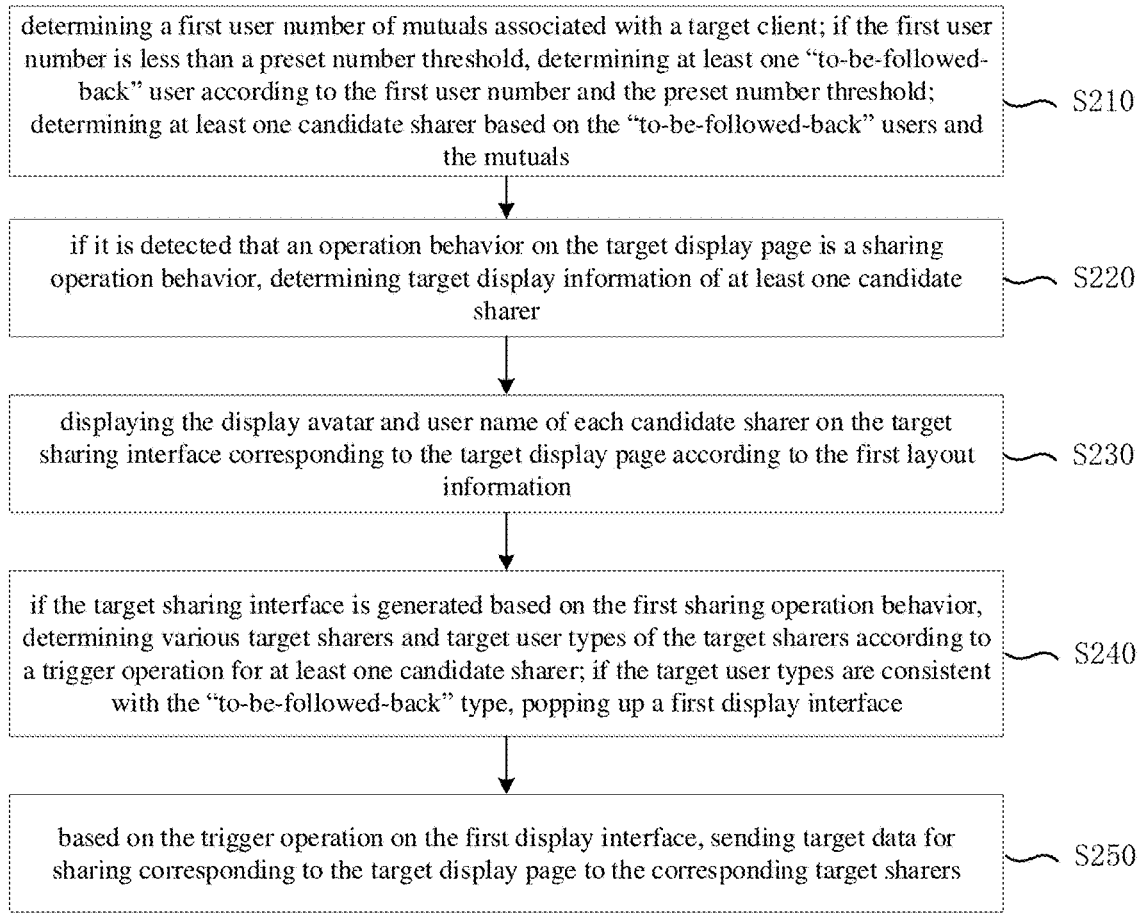
FIG. 2 is a flowchart of a data processing method provided in some embodiments of the present disclosure.

FIG. 2 is a flowchart of a data processing method provided in some embodiments of the present disclosure. On the basis of the foregoing embodiment, "to-be-followed-back" users are determined according to a first user number of the mutuals and a preset number threshold, thereby preventing displaying too many candidate sharers which is against the actual sharing intention of the user. if a first sharing operation behavior is detected, the avatars and user names of the candidate sharers are displayed on a target sharing interface based on first layout information. After sharing target data for sharing with the mutuals, a first display interface is further displayed and a trigger operation of the user is detected, so as to provide a way for the user to directly follow back other users while sharing data in a progressive manner. Reference can be made to the technical scheme of this embodiment for a specific implementation thereof. Wherein, the same or corresponding technical terms as the above embodiment will not be repeated herein.

As shown in FIG. 2, the method specifically includes the following steps:

S210: determining a first user number of mutuals associated with a target client; if the first user number is less than a preset number threshold, determining at least one "to-be-followed-back" user according to the first user number and the preset number threshold; determining at least one candidate sharer based on the "to-be-followed-back" users and the mutuals.

In this embodiment, the target client is a client on which the user registers with an application and then logs into the application. The target client corresponds to the registered user. Before the registered user performs a sharing operation, a server corresponding to the client can obtain a friends list of the registered user, and then determine the number of his/her friends. At this time, the friends are mainly mutuals. Accordingly, the number of the friends is mainly the first user number.

In this embodiment, in order to prevent displaying too many determined candidate sharers which is against the actual sharing intention of the user, and impacting the user's experience of using the product, the server may set a number threshold in advance for the number of candidate sharers. Specifically, after determining the first user number of the mutuals, it can be compared with the preset number threshold. Only if the first user number is less than the preset number threshold, a corresponding number for users will be selected from the list of "to-be-followed-back" users according to a difference between the two values. Wherein, when the registered user is followed by "to-be-followed-back" users, they can be added to a list of "to-be-followed-back" users, so that they can be retrieved from the list of "to-be-followed-back" users for the display of the "to-be-followed-back" users.

Further, after determining the mutuals and the "to-be-followed-back" users, at least one candidate sharer can be determined from these users. Since the mutuals correspond to the mutual type and the at least one "to-be-followed-back" user corresponds to the "to-be-followed-back" type, it can be understood that the determined candidate sharers can include both of the above two types of users, or only users of the "to-be-followed-back" type. Those skilled in the art should understand that the specific rules for determining the candidate sharers from the mutuals and the "to-be-followed-back" users can be specified according to actual needs, which is not specifically limited in the embodiments of the present disclosure.

It should also be noted that in actual practice, if a mutual or a "to-be-followed-back" user does not have the permission to receive the content to be shared, he/she will not be determined as the candidate sharer.

S220: if it is detected that an operation behavior on the target display page is a sharing operation behavior, determining target display information of at least one candidate sharer.

Wherein, the sharing operation behavior includes at least one of: a first sharing operation behavior of clicking a Share control; a second sharing operation behavior of pressing at a target area for a preset time. The first sharing operation behavior described above will be described in detail below in conjunction with FIGS. 3, 4 and 5.

In this embodiment, if it is detected that an operation behavior on a target display page is a first sharing operation behavior, the display avatar and user name of the at least one candidate sharer, as well as first layout information of the display avatar on the target sharing interface, are determined; the target display information is determined based on the first layout information, the display avatar and the user name.

Figure 3:
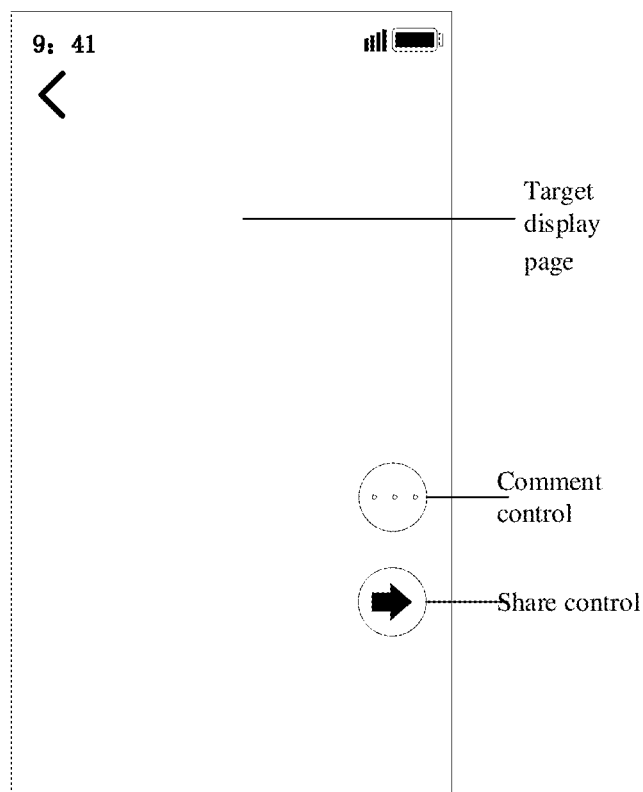
FIG. 3 is a target display page corresponding to a target client provided in some embodiments of the present disclosure.

As shown in FIG. 3, in addition to providing multimedia information to the user, the target display page also include a Comment control and a Share control developed according to different business logic. When it is detected that the user clicks the Share control, it can be determined that this sharing operation behavior is a first sharing operation behavior. Correspondingly, the target client can respond to the first sharing operation behavior, and determine the display avatar, user name and first layout information of the display avatar on the target sharing interface for at least one candidate sharer. Wherein, the display avatar and user name can be understood as multi-dimensional identification information representing a candidate sharer. The first layout information is used to determine how the various display avatars and user names are arranged on the target display interface. The first layout information can be information indicating that the avatars of the mutuals are displayed prior to the avatars of the "to-be-followed-back" users, and the user names of the mutuals are displayed associated with their user avatars.

S230: displaying the display avatar and user name of each candidate sharer on the target sharing interface corresponding to the target display page according to the first layout information.

Figure 4:
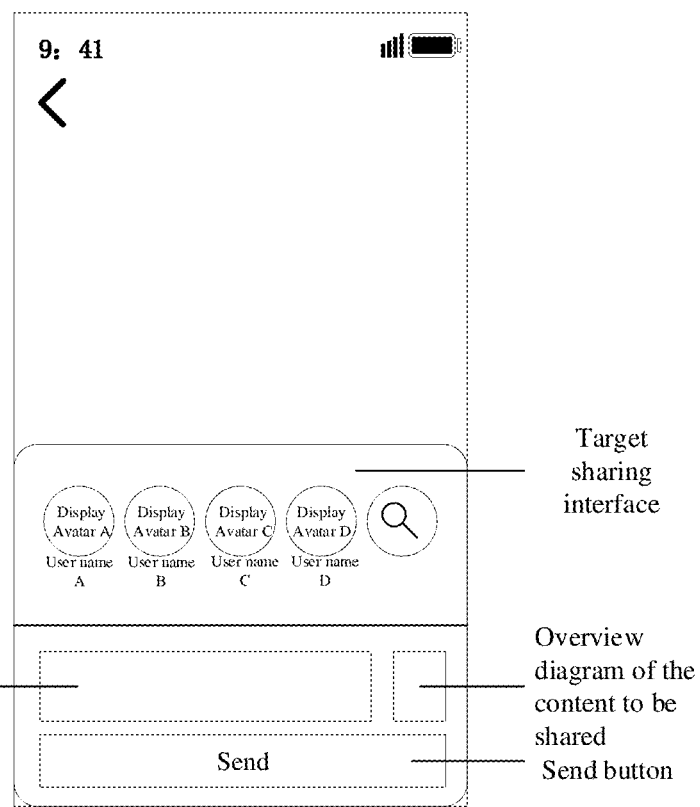
FIG. 4 is a target sharing interface corresponding to a first sharing operation behavior provided in some embodiments of the present disclosure.

In this embodiment, after the target display information of the candidate sharers has been determined, a corresponding target sharing interface can be displayed over the target display page. The target sharing interface includes the display avatars and user names of the candidate sharers. Moreover, the various display avatars and user names are arranged according to interface parameters reflected by the first layout information. As shown in FIG. 4, based on the first layout information, mutuals A and B are displayed prior to "to-be-followed-back" users C and D. The display avatars and user names of users A, B, C, and D may be displayed horizontally at the upper side of the target sharing interface. At the lower side of the target sharing interface, an overview diagram of the content to be shared, an edit box for editing text information, and a send button are included. It can be understood that the displayed overview diagram is used to assist the user to determine the content to be shared. The edit box provides a way for the user to send text messages while sharing the content with other users.

It should be noted that the first layout information includes display order information of at least one candidate sharer. Wherein, the display order information is used to determine the horizontal display order of multiple candidate sharers on the target sharing interface, including the display order of different types of candidate sharers. It can be understood that, for different types of candidate sharers, the display positions of their display avatars and user names in the horizontal list shown in FIG. 4 are determined by the display order of the users. In actual practice, the display order of the mutual type is prior to the display order of the "to-be-followed-back" type. For example, if the mutual type is displayed prior to the "to-be-followed-back" type, the display avatars and user names of the candidate sharers will be displayed horizontally on the target sharing interface in an order where the mutuals are displayed on the left and the "to-be-followed-back" users are displayed on the right.

The advantage of this arrangement is that, with the limited space on the target sharing interface, the customization of the display order of the candidate sharers is achieved, and the user's sharing intention can be satisfied to the greatest extent while expanding the scope of sharing of the users.

S240: if the target sharing interface is generated based on the first sharing operation behavior, determining various target sharers and target user types of the target sharers according to a trigger operation for at least one candidate sharer. If the target user types are consistent with the "to-be-followed-back" type, a first display interface is popped up.

In this embodiment, when a target sharing interface shown in FIG. 4 is displayed on the target display page, the user performing the first sharing operation behavior can click on the display avatar or user name of each candidate sharer, so as to determine the target sharers from the candidate sharers according to their actual sharing intention, that is, the selected candidate sharers are the target sharers. It should also be noted that when the user performs the above trigger operation, a preset identification such as a check mark can be displayed on the display avatar of the selected candidate sharer as feedback to the user's trigger operation.

Further, when determining the target sharers, the target client can also determine the target user types corresponding to these users, and perform subsequent processing steps in different manners for different types of target sharers.

Specifically, when it is determined that a target sharer is of the mutual type, the current content can be directly sent to a client corresponding to the mutual; when it is determined that a target sharer is of the "to-be-followed-back" type, in order to provide more abundant functions to the user performing the first sharing operation behavior, a first display interface can be popped up. As shown in FIG. 5, the target client can pop up a corresponding first display interface in the middle of the target display page after the target sharing interface is closed and the target display page is recovered. It can be determined that the first display interface includes target sharers of the "to-be-followed-back" type.

S250: based on the trigger operation on the first display interface, sending target data for sharing corresponding to the target display page to the corresponding target sharers.

In this embodiment, after the target client pops up the first display interface, the user performing the first sharing operation can send target data for sharing to the users of the "to-be-followed-back" type included in the interface by a trigger operation.

Wherein, the target data for sharing can be all the contents currently displayed on the target display page or some contents manually selected by the user from the target display page. Those skilled in the art should understand that regardless of whether the information is multimedia information or text information provided by the target client, as long as the information has a selectable and sharable attribute, it can be determined as the target data for sharing.

In some embodiments, when it is detected that a Follow Back and Share control on the first display interface is triggered, the target data for sharing is sent to the corresponding target sharers, and then the target display page is displayed again.

As shown in FIG. 5, in addition to displaying the candidate sharers of the "to-be-followed-back" type, the first display interface further includes a Follow Back and Share control and a Cancel control. The Follow Back and Share control is used to realize the function of following a user and sending the target data for sharing to the corresponding client of the user.

Referring again to FIG. 5, on the one hand, during browsing the display avatar and user name of each "to-be-followed-back" user on the first display interface, if the user performing the first sharing operation behavior finds that there are some users he/she want to follow and who meet his/her sharing intention, these users can be selected by clicking a select box corresponding to each of these target sharers. Further, by clicking the Follow Back and Share control, these users can be followed while the target data for sharing are sent to their corresponding clients. On the other hand, if it is found that there are no users who can meet the sharing intention of the user performing the first sharing operation behavior, and are desired to be followed by the user performing the first sharing operation behavior, the Cancel button can be clicked to choose not to follow the "to-be-followed-back" users on the first display interface, and not to send the target data for sharing.

It should be noted that no matter whether the user performing the first sharing operation behavior selects the Follow Back and Share control or the Cancel control, the target client will recover the target display page after the user's operation and continue to display the contents on the target display page, so as to avoid the sharing operation affecting the user's browsing of other information provided by the application.

In the technical scheme of this embodiment, "to-be-followed-back" users are determined according to the first user number of the mutuals and a preset number threshold, so as to prevent displaying too many candidate sharers which is against the user's actual sharing intention; if a first sharing operation behavior is detected, the avatars and user names of the candidate sharers are displayed on a target sharing interface based on first layout information; after sending target data for sharing to the mutuals, a first display interface is further displayed and a trigger operation of the user is detected, so as to provide a way for the user to directly follow back other users while sharing data in a progressive manner.

FIG. 6 is a flowchart of a data processing method provided in some embodiments of the present disclosure. On the basis of the foregoing embodiment, if a second sharing operation behavior is detected, the display avatars of the mutuals, and the display avatars and source information of the "to-be-followed-back" users are displayed on a target sharing interface based on second layout information, making the user more purposeful in the process of sharing data; through displaying different types of candidate sharers together on the interface, this method can not only provide another way to follow back other users while sharing data, but also simplifies the steps of sharing data with different types of users, which further reduces the limitation of sharing operation on the target client. Reference can be made to the technical scheme of this embodiment for a specific implementation thereof. Wherein, the same or corresponding technical terms as the above embodiment will not be repeated herein.

As shown in FIG. 6, the method specifically includes the following steps:

S310: if it is detected that an operation behavior on the target display page is a sharing operation behavior, determining target display information of at least one candidate sharer.

Wherein, the sharing operation behavior includes at least one of: a first sharing operation behavior of clicking a Share control; a second sharing operation behavior of pressing at a target area for a preset time. The second sharing operation behavior described above will be described in detail below in conjunction with FIGS. 7 and 8.

In this embodiment, if it is detected that an operation behavior on a target display page is a second sharing operation behavior, user types of the various candidate sharers are determined, and target display information of corresponding candidate sharers is determined based on their user types.

Figure 7:
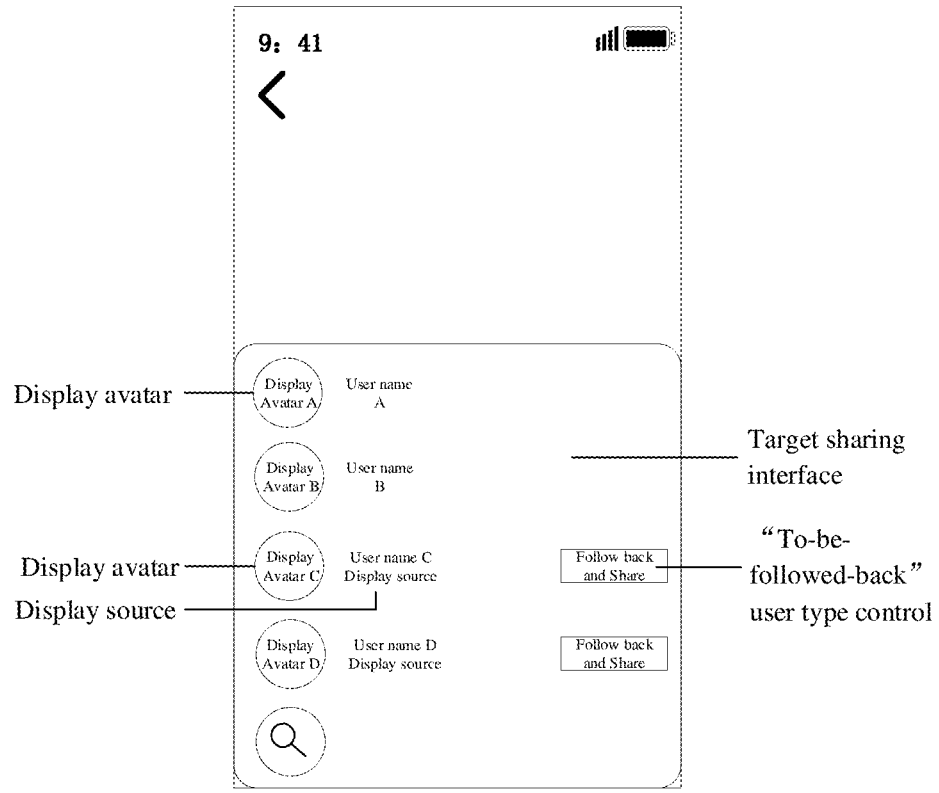
FIG. 7 is a target sharing interface corresponding to a second sharing operation behavior provided in some embodiments of the present disclosure.

As shown in FIG. 7, when the target client detects that the user's pressing duration on a target area reaches a preset duration, it may be determined that the user's behavior is the second sharing operation behavior. Wherein, the target area can be any area other than the Comment control and the Share control shown in FIG. 3, or can be obtained through dividing the target display page by the developer in advance, which is not specifically limited in this embodiment of the present disclosure.

After determining the user's second sharing operation behavior, the target client can further respond to the second sharing operation behavior and determine the user types of the candidate sharers, wherein the target user types include a mutual type and a "to-be-followed-back" type, that is, the candidate sharers include users who are mutuals of the user performing the second sharing operation behavior, and also include users who are not followed by the user performing the second sharing operation behavior.

Similar to the processing method of the first sharing operation behavior, after detecting the user's second sharing operation behavior, the target client can determine target display information of corresponding candidate sharers based on their user types. In some embodiments, if the user type is the mutual type, a display avatar of the corresponding candidate sharer is determined; if the user type is the "to-be-followed-back" type, a display avatar and a display source of the corresponding candidate sharer are determined; a second layout information of at least one candidate sharer on a target sharing interface is determined; target display information of a corresponding candidate sharer is determined based on the second layout information, the display avatar, and the display avatar and the display source.

Specifically, for a candidate sharer of the mutual type, the target client can determine the user's display avatar, and for a candidate sharer of the "to-be-followed-back" type, the target client can determine the user's display avatar and display source. Wherein, the display source of a candidate sharer can be information reflecting the source of the user, or information reflecting the association relationship between the candidate sharer and the user performing the second sharing operation behavior. For example, if the display source is "a user from the address book", it indicates that the candidate sharer is determined based on the address book. If the display source is "a user in common group A", it indicates that the candidate sharer and the user performing the second sharing operation are both in group A.

Due to the difference between the first sharing operation behavior and the second sharing operation behavior, their corresponding target sharing interfaces are also different. Therefore, in this embodiment, when a second sharing operation behavior performed by the user is detected, it is also necessary to determine second layout information of the candidate sharers on the target sharing interface. It can be understood that the second layout information is used to determine the layout mode of the display avatars of the mutuals, and the display avatars and display sources of the "to-be-followed-back" users on the target sharing interface, which can be understood as interface parameters corresponding to a subsequently generated target sharing interface. Further, the above information is aggregated to obtain the target display information of the candidate sharers.

S320: displaying the display avatars of the candidate sharers whose user type is the mutual type, and the display avatars and display sources of the candidate sharers whose user type is the "to-be-followed-back" type on a target sharing interface corresponding to the target display page according to the second layout information.

In this embodiment, after determining the target display information of the candidate sharers, a corresponding target sharing interface can be displayed over the target display page. The target sharing interface includes the display avatars of the mutuals, and the display avatars and display sources of the "to-be-followed-back" users retrieved from the target display information. The above display avatars and display sources are also arranged according to the interface parameters reflected in the second layout information. As shown in FIG. 7, based on the second layout information, the display avatars of user A and user B of the mutual type can be displayed vertically on the target sharing interface, and the display avatars and display sources of user C and user D of the "to-be-followed-back" type are displayed vertically after user A and user B in sequence. The target sharing interface further includes a type control corresponding to the user type, such as whether the user is of the "to-be-followed-back" type or the mutual type. As shown in FIG. 7, for user C and user D who are not followed by the user performing the second sharing operation behavior, there is a control associated with the "to-be-followed-back" type at the right side of the display avatar and display source of the user. As can be understood, the control is at least used to implement the function of sending the target data for sharing to the corresponding client of the user and following the user simultaneously.

It should be noted that, similar to the first layout information, the second layout information also includes display order information of the at least one candidate sharer, wherein the candidate sharers of the mutual type are displayed prior to those of the "to-be-followed-back" type. On this basis, on the target sharing interface corresponding to the second sharing operation behavior, the display avatars of the candidate sharers will also be displayed vertically in an order where the mutuals are at the top and the "to-be-followed-back" users are at the bottom.

S330: if the target sharing interface is generated based on the second sharing operation behavior, when it is detected that a user type control triggered is a "to-be-followed-back" type control, the corresponding target sharer is followed back, and target data for sharing corresponding to the target display page is sent to the target sharer.

Figure 8:
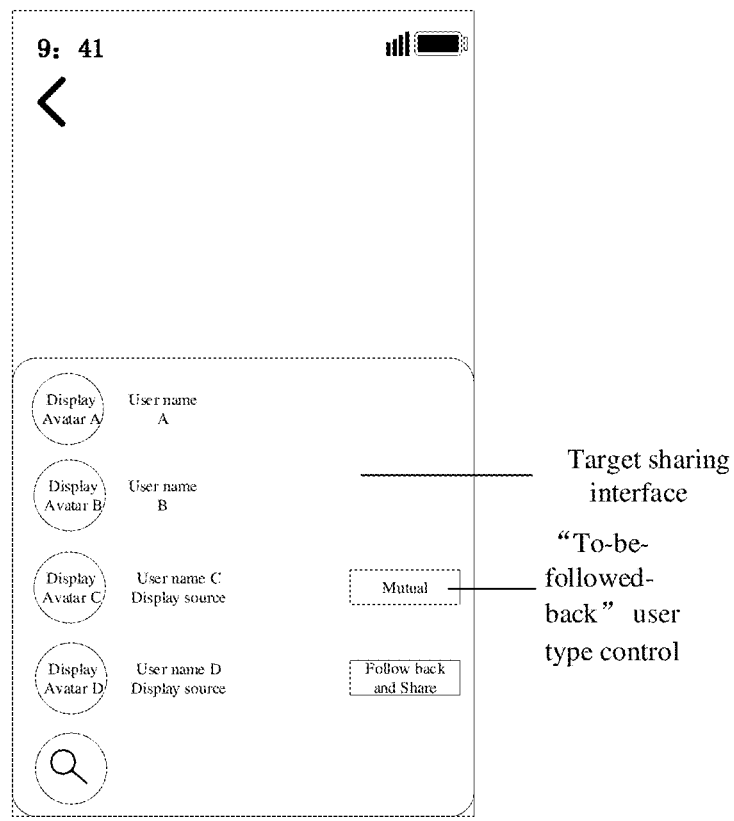
FIG. 8 is a target sharing interface corresponding to a second sharing operation behavior provided in some embodiments of the present disclosure.

In this embodiment, after the target client displays the target sharing interface corresponding to the second sharing operation behavior, the user performing the second sharing operation behavior does not need to select from the display avatars of candidate sharers. Instead, the user only needs to click each candidate sharer according to his/her sharing intention to send target data for sharing to the client corresponding to the clicked user. As shown in FIG. 8, when the user clicks the display avatar of a mutual, the sharing of the target data for sharing can be realized; when the user clicks a "to-be-followed-back" type control corresponding to the "to-be-followed-back" user, the "to-be-followed-back" user can be followed by the user, in addition to sending the target data for sharing to the client corresponding to the "to-be-followed-back" user. Further, when the user triggers a "to-be-followed-back" type control, the control can display text information such as "mutual" as feedback of the user's operation.

According to the technical scheme of the present embodiment, if a second sharing operation behavior is detected, the display avatars of the mutuals, and the display avatars and source information of the "to-be-followed-back" users are displayed on the target sharing interface based on second layout information, making the user more purposeful in the process of sharing data; through displaying different types of candidate sharers together on the interface, this method can not only provide another way to follow back other users while sharing data, but also simplifies the steps of sharing data with different types of users, further reducing the limitation of sharing operation on the target client.

On the basis of some embodiments of this disclosure, the target client may detect a first sharing operation behavior or a second sharing operation behavior for several times. Further, in the process of multi-time data sharing by a user, one or more users of the "to-be-followed-back" type may be displayed on the target sharing interface for many times, but may never be followed back by the user or selected as target sharers. In this regard, the target client can process the above users of the "to-be-followed-back" type in the following manner.

In some embodiments, if the display frequency of a candidate sharer of the "to-be-followed-back" type on the target sharing interface reaches a preset display frequency threshold, the candidate sharer will be replaced based on other "to-be-followed-back" users when the target sharing interface is displayed again.

Specifically, regardless of whether the user performs a first sharing operation behavior or a second sharing operation behavior, the target client may record the users of the "to-be-followed-back" type displayed on the corresponding target sharing interface, and sum the times for each of these users being displayed on the target sharing interface, until they are followed by the user performing the sharing operation behavior.

In addition, the target client may set a display frequency threshold for the "to-be-followed-back" users in advance. It can be understood that when the actual display frequency of a "to-be-followed-back" user is less than the preset display frequency threshold, this user still has the possibility of being followed back by the user sharing data, so this "to-be-followed-back" user will continue to be displayed on the subsequently generated target sharing interface. When the actual display frequency of a "to-be-followed-back" user reaches the preset display frequency threshold, it indicates that this user does not meet the sharing intention of the user sharing data. Therefore, this user can be replaced based on the list of "to-be-followed-back" users. For example, if the display frequency of user C of the "to-be-followed-back" type on the target sharing interface has reached the preset display frequency threshold, it indicates that the user performing the sharing operation has never followed user C or shared data with user C during multiple sharing processes. Based on this, when the target sharing interface is displayed again on the target display page, the target client can select a "to-be-followed-back" user from the list of "to-be-followed-back" users to replace user C, and generate a corresponding display sequence in the first layout information or the second layout information. In this way, the intelligence of sharing operation can be further improved.

Figure 9:
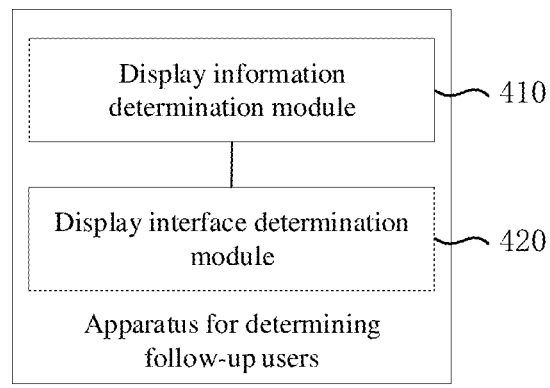
FIG. 9 is a structural block diagram of a data processing apparatus provided in some embodiments of the present disclosure.

FIG. 9 is a structural block diagram of a data processing apparatus provided in some embodiments of the present disclosure, which can execute the data processing method provided in any embodiment of the present disclosure, and has corresponding functional modules to implement the method and achieve the beneficial effect of the present disclosure. As shown in FIG. 9, the apparatus specifically includes a display information determination module 410 and a display interface determination module 420.

The display information determination module 410 is used for, if it is detected that an operation behavior on a target display page is a sharing operation behavior, determining target display information of at least one candidate sharer; wherein, user types corresponding to the at least one candidate sharer include a "to-be-followed-back" type.

The display interface determination module 420 is used for, based on the target display information, displaying the at least one candidate sharer on a target sharing interface corresponding to the target display page.

On the basis of the above technical schemes, the data processing apparatus further includes a candidate sharer determination module.

The candidate sharer determination module is used for determining a first user number of mutuals associated with a target client; wherein, the mutuals corresponds to a mutual type; if the first user number is less than a preset number threshold, determining at least one "to-be-followed-back" user according to the first user number and the preset number threshold; wherein, the at least one "to-be-followed-back" user corresponds to a "to-be-followed-back" type; determining at least one candidate sharer based on the "to-be-followed-back" users and the mutuals.

On the basis of the above technical schemes, the sharing operation behavior includes at least one of: a first sharing operation behavior of clicking a Share control; a second sharing operation behavior of pressing at a target area for a preset time.

On the basis of the above technical schemes, the display information determination module 410 includes a first sharing operation behavior processing unit and a second sharing operation behavior processing unit.

The first sharing operation behavior processing unit is used for, if it is detected that an operation behavior on a target display page is a first sharing operation behavior, determining a display avatar and a user name of at least one candidate sharer, as well as first layout information of the display avatar on the target sharing interface; determining the target display information based on the first layout information, the display avatar and the user name.

In some embodiments, the display interface determination module 420 is further used for displaying the display avatar and user name of each candidate sharer on the target sharing interface corresponding to the target display page according to the first layout information.

The second sharing operation behavior processing unit is used for, if it is detected that an operation behavior on a target display page is a second sharing operation behavior, determining user types of various candidate sharers, and determining target display information of corresponding candidate sharers based on their user types; wherein, the target user types include a mutual type and a "to-be-followed-back" type.

In some embodiments, the second sharing operation behavior processing unit is further used for, if the user type is the mutual type, determining a display avatar of a corresponding candidate sharer; if the user type is the "to-be-followed-back" type, determining a display avatar and a display source of the corresponding candidate sharer; determining second layout information of the at least one candidate sharer on the target sharing interface; determining target display information of the corresponding candidate sharer based on the second layout information, the display avatar, and the display avatar and the display source.

In some embodiments, the display interface determination module 420 is further used for displaying the display avatars of the candidate sharers whose user type is the mutual type, and the display avatars and display sources of the candidate sharers whose user type is the "to-be-followed-back" type on a target sharing interface corresponding to the target display page according to the second layout information; wherein, the target sharing interface includes a type control corresponding to the user type.

On the basis of the above technical schemes, the first layout information and the second layout information include display order information of the at least one candidate sharer; wherein, the display order of the mutual type is prior to the display order of the "to-be-followed-back" user type.

On the basis of the above technical schemes, the data processing apparatus further includes a target data sharing module.

The target data sharing module is used for, if the target sharing interface is generated based on the first sharing operation behavior, determining various target sharers and target user types of the target sharers according to a trigger operation for the at least one candidate sharer; If the target user types are consistent with the "to-be-followed-back" type, popping up a first display interface; wherein, the first display interface includes target sharers of the "to-be-followed-back" type; based on a trigger operation on the first display interface, sending target data for sharing corresponding to the target display page to the corresponding target sharers.

In some embodiments, the target data sharing module is further used for, when it is detected that a Follow Back and Share control on the first display interface is triggered, sending the target data for sharing to the corresponding target sharers, and then recovering the target display page.

In some embodiments, the target data sharing module is further used for, if the target sharing interface is generated based on the second sharing operation behavior, when it is detected that a user type control triggered is the "to-be-followed-back" type control, following back a corresponding target sharer, and sending the target data for sharing corresponding to the target display page to the target sharer.

In some embodiments, the data processing apparatus further includes a candidate sharer replacement module.

The candidate sharer replacement module is used for, if the display frequency of a candidate sharer of the "to-be-followed-back" type on the target sharing interface reaches a preset display frequency threshold, replacing the candidate sharer based on other "to-be-followed-back" users when the target sharing interface is displayed again.

According to the technical scheme of this embodiment, if it is detected that an operation behavior on the target display page is a sharing operation behavior, target display information of at least one candidate sharer is determined, that is, when a user performs a sharing operation, display information of at least one "to-be-followed-back" user who is a follower of the user, but is not followed back by the user is determined; further, based on the target display information, the at least one candidate sharer is displayed on a target sharing interface corresponding to the target display page, to provide a way for the user performing the sharing operation to share a content with a "to-be-followed-back" user, so that the business logic of the sharing function is improved, and scope of interaction corresponding to the user sharing operation is expanded, which is helpful to improve the user activeness and use experience of the product.

Embodiments of the disclosure can improve the flexibility and convenience of user interaction, and further improve the user activeness on a product.

The data processing apparatus provided in this embodiment of the present disclosure can execute the data processing method provided in any embodiment of the present disclosure, and has corresponding functional modules to implement the method and achieve the beneficial effect of the present disclosure.

It should be noted that the units and modules included in the above apparatus are only divided according to the functional logic, but are not limited to the above division, as long as the corresponding functions can be realized; In addition, the specific names of the functional units are only for the convenience of distinguishing from each other, and are not used to limit the protection scope of the embodiments of the present disclosure.

Figure 10:
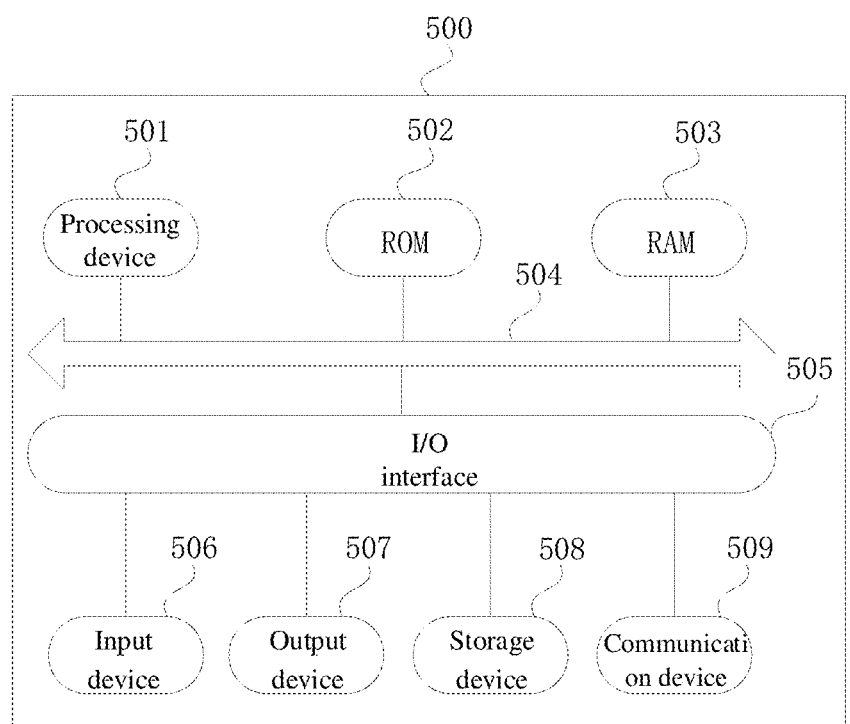
FIG. 10 is a structural diagram of an electronic device provided in some embodiments of the present disclosure.

FIG. 10 is a structural diagram of an electronic device provided in some embodiments of the present disclosure. Referring now to FIG. 10, a structural diagram of an electronic device (e.g., a terminal device or server shown in FIG. 10) 500 suitable for implementing embodiments of the present disclosure is shown. The terminal device of the embodiment of the present disclosure may include, but not limited to, a mobile terminal such as a mobile phone, a notebook computer, a digital broadcast receiver, a PDA (Personal Digital Assistant), a PAD (tablet computer), a PMP (Portable Multimedia Player), an on-board terminal (such as an on-board navigation terminal), or the like, and a fixed terminal such as a digital TV, a desktop computer, and the like. The electronic device shown in FIG. 10 is merely an example and should not impose any limitation on the function and use scope of the embodiment of the present disclosure.

As shown in FIG. 10, the electronic device 500 may include a processing device (e.g., a central processing unit, a graphics processor, or the like) 501, which may perform various appropriate actions and processes according to a program stored in Read Only Memory (ROM) 502 or a program loaded from storage device 506 into Random Access Memory (RAM) 503. In RAM 503, various programs and data required for the operation of the electronic device 500 are also stored. Processing device 501, ROM 502 and RAM 503 are connected to each other through bus 504. Input/Output (I/O) interface 505 is also connected to bus 504.

Generally, the following devices can be connected to I/O interface 505: an editing device 506 including, for example, a touch screen, a touch pad, a keyboard, a mouse, a camera, a microphone, an accelerometer, a gyroscope, etc; an output device 507 including, for example, a liquid crystal display (LCD), a speaker, a vibrator, etc.; a storage device 506 including, for example, a magnetic tape, a hard disk, etc.; and a communication device 509. The communication device 509 enables the electronic device 500 to perform wireless or wired communication with other devices to exchange data. Although FIG. 10 shows the electronic device 500 with various components, it should be understood that it is not required to implement or have all of these components. Alternatively, more or fewer components can be implemented or provided.

In particular, according to embodiments of the present disclosure, the processes described above with reference to the flowchart can be implemented as a computer software program. For example, embodiments of the present disclosure include a computer program product, which includes a computer program carried on a non-transitory computer readable medium. The computer program contains program code for executing the method shown in the flowchart. In such embodiments, the computer program may be downloaded and installed from the network through the communication device 509, or installed from the storage device 506, or installed from the ROM 502. When the computer program is executed by the processing device 501, the above functions defined in the methods of the embodiments of the present disclosure are performed.

The names of messages or information exchanged between multiple devices in the embodiments of the present disclosure are only used for illustrative purposes, and are not used to limit the scope of the messages or information.

The electronic device provided by this embodiment of the present disclosure and the data processing method provided by the above embodiment belong to the same inventive concept. For the technical details not described in detail in this embodiment, reference can be made to the above embodiment, and this embodiment can achieve the same beneficial effect as the above embodiment.

Embodiments of the present disclosure also provide a computer storage medium on which a computer program is stored, which when executed by a processor implements the data processing method provided in the above embodiment.

It should be noted that the computer-readable medium in the present disclosure may be a computer-readable signal medium or a computer-readable storage medium, or any combination thereof. The computer readable storage medium can be, for example, but not limited to, an electronic, magnetic, optical, electromagnetic, infrared, or semiconductor system, apparatus, or device, or any combination of the above. More specific examples of the computer readable storage medium may include, but is not limited to: electrical connection with one or more wires, portable computer disk, hard disk, random access memory (RAM), read only memory (ROM), erasable programmable read only memory (EPROM or flash), fiber optics, portable compact disk read only memory (CD-ROM), optical storage device, magnetic storage device, or any suitable combination of the foregoing. In the present disclosure, a computer readable storage medium can be any tangible medium that can contain or store a program, which can be used by or in connection with an instruction execution system, apparatus or device. In the present disclosure, a computer readable signal medium may include a data signal that is propagated in the baseband or as part of a carrier, with computer readable program code carried therein. Such propagated data signals can take a variety of forms including, but not limited to, electromagnetic signals, optical signals, or any suitable combination of the foregoing. The computer readable signal medium can also be any computer readable medium other than a computer readable storage medium, which can transmit, propagate, or transport a program for use by or in connection with the instruction execution system, apparatus, or device. Program code embodied on a computer readable medium can be transmitted using any suitable medium, including but not limited to wire, fiber optic cable, RF (radio frequency), etc., or any suitable combination of the foregoing.

In some embodiments, a client and a server can communicate using any currently known or future developed network protocol such as HTTP (HyperText Transfer Protocol), and can be interconnected with any form or medium of digital data communication, e.g., a communication network. Examples of communication networks include a local area network ("LAN") and a wide area network ("WAN"), an internetwork (e.g., the Internet), and end-to-end networks (for example, ad hoc end-to-end networks), as well as any currently known or future developed networks.

The computer-readable medium described above may be included in the electronic device described above; or it may exist alone without being assembled into the electronic device.

The computer-readable medium carries one or more programs that, when executed by the electronic device, cause the electronic device to:

if it is detected that an operation behavior on a target display page is a sharing operation behavior, determine target display information of at least one candidate sharer; wherein, user types corresponding to the at least one candidate sharer include a "to-be-followed-back" type;

display the at least one candidate sharer on a target sharing interface corresponding to the target display page based on the target display information.

The computer program code for executing operations of the present disclosure may be written by one or more programming languages or any combination thereof, the programming languages including object-oriented programming languages, such as Java, Smalltalk, C++, etc, as well as conventional procedural programming languages, such as "C" programming language or similar programming language. A program code may be completely or partly executed on a user computer, or executed as an independent software package, partly executed on the user computer and partly executed on a remote computer, or completely executed on a remote computer or server. In the circumstances involving a remote computer, the remote computer may be connected to the user computer through any kind of network, including local area network (LAN) or wide area network (WAN), or connected to an external computer (for example via Internet using an Internet service provider).

The flowcharts and block diagrams in the drawings illustrate the architecture, functionality, and operation of some possible implementations of the apparatuses, methods and computer program products according to various embodiments of the disclosure. In this regard, each block in the flowcharts or block diagrams may represent a module, a code segment, or a portion of code, which comprises one or more executable instructions for implementing the specified function or functions. It should also be noted that, in some alternative implementations, the functions noted in the blocks may occur out of the order noted in the figures. For example, two blocks shown in succession may be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, can be implemented by special purpose hardware-based systems that perform the specified functions or acts, or combinations of special purpose hardware and computer instructions.

The units involved in the embodiments described in the present disclosure can be implemented in software or hardware. Wherein, the name of a unit does not constitute a limitation of the unit itself under certain circumstances, for example, a first acquisition unit may also be described as "a unit that obtains at least two Internet Protocol addresses".

The functions described above may be performed at least in part by one or more hardware logic components. For example, without limitation, exemplary types of hardware logic components that can be used include: Field Programmable Gate Array (FPGA), Application Specific Integrated Circuit (ASIC), Application Specific Standard Product (ASSP), System on Chip (SOC), Complex Programmable Logic Device (CPLD), etc.

In the context of the present disclosure, a machine-readable medium may be a tangible medium, which may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include electrical connection with one or more wires, portable computer disk, hard disk, random access memory (RAM), read only memory (ROM), erasable programmable read only memory (EPROM or flash), fiber optics, portable compact disk read only memory (CD-ROM), optical storage device, magnetic storage device, or any suitable combination of the foregoing.

According to one or more embodiments of the present disclosure, [Example 1] provides a data processing method, the method including:

if it is detected that an operation behavior on a target display page is a sharing operation behavior, determining target display information of at least one candidate sharer; wherein, user types corresponding to the at least one candidate sharer include a "to-be-followed-back" type;

displaying the at least one candidate sharer on a target sharing interface corresponding to the target display page based on the target display information.

According to one or more embodiments of the present disclosure, [Example 2] provides a data processing method, further including:

In some embodiments, determining a first user number of mutuals associated with a target client; wherein, the mutuals corresponds to a mutual type;

if the first user number is less than a preset number threshold, determining at least one "to-be-followed-back" user according to the first user number and the preset number threshold; wherein, the at least one "to-be-followed-back" user corresponds to a "to-be-followed-back" type;

determining at least one candidate sharer based on the "to-be-followed-back" users and the mutuals.

According to one or more embodiments of the present disclosure, [Example 3] provides a data processing method, further including:

In some embodiments, the sharing operation behavior includes at least one of: a first sharing operation behavior of clicking a Share control; a second sharing operation behavior of pressing at a target area for a preset time.

According to one or more embodiments of the present disclosure, [Example 4] provides a data processing method, further including:

In some embodiments, if it is detected that an operation behavior on a target display page is a first sharing operation behavior, determining a display avatar and a user name of at least one candidate sharer, as well as first layout information of the display avatar on the target sharing interface;

determining the target display information based on the first layout information, the display avatar and the user name.

According to one or more embodiments of the present disclosure, [Example 5] provides a data processing method, further including:

In some embodiments, displaying the display avatar and user name of each candidate sharer on the target sharing interface corresponding to the target display page according to the first layout information.

According to one or more embodiments of the present disclosure, [Example 6] provides a data processing method, further including:

In some embodiments, if it is detected that an operation behavior on a target display page is a second sharing operation behavior, determining user types of various candidate sharers, and determining target display information of corresponding candidate sharers based on their user types;

wherein, the target user types include a mutual type and a "to-be-followed-back" type.

According to one or more embodiments of the present disclosure, [Example 7] provides a data processing method, further including:

In some embodiments, if the user type is the mutual type, determining a display avatar of the corresponding candidate sharer;

if the user type is the "to-be-followed-back" type, determining a display avatar and a display source of the corresponding candidate sharer;

determining second layout information of the at least one candidate sharer on the target sharing interface;

determining target display information of the corresponding candidate sharer based on the second layout information, the display avatar, and the display avatar and the display source.

According to one or more embodiments of the present disclosure, [Example 8] provides a data processing method, further including:

In some embodiments, displaying the display avatars of the candidate sharers whose user type is the mutual type, and the display avatars and display sources of the candidate sharers whose user type is the "to-be-followed-back" type on a target sharing interface corresponding to the target display page according to the second layout information;

wherein, the target sharing interface includes a type control corresponding to the user type.

According to one or more embodiments of the present disclosure, [Example 9] provides a data processing method, further including:

In some embodiments, the first layout information and the second layout information include display order information of the at least one candidate sharer;

wherein, the display order of the mutual type is prior to the display order of the "to-be-followed-back" type.

According to one or more embodiments of the present disclosure, [Example 10] provides a data processing method, further including:

In some embodiments, if the target sharing interface is generated based on the first sharing operation behavior, determining various target sharers and target user types of the target sharers according to a trigger operation for the at least one candidate sharer;

if the target user types are consistent with the "to-be-followed-back" type, popping up a first display interface; wherein, the first display interface includes target sharers of the "to-be-followed-back" type;

based on a trigger operation on the first display interface, sending target data for sharing corresponding to the target display page to the corresponding target sharers.

According to one or more embodiments of the present disclosure, [Example 11] provides a data processing method, further including:

In some embodiments, when it is detected that a Follow Back and Share control on the first display interface is triggered, sending the target data for sharing to the corresponding target sharers, and then displaying the target display page again.

According to one or more embodiments of the present disclosure, [Example 12] provides a data processing method, further including:

In some embodiments, if the target sharing interface is generated based on the second sharing operation behavior, when it is detected that a user type control triggered is the "to-be-followed-back" type control, following back a corresponding target sharer, and sending the target data for sharing corresponding to the target display page to the target sharer.

According to one or more embodiments of the present disclosure, [Example 13] provides a data processing method, further including:

In some embodiments, if the display frequency of a candidate sharer of the "to-be-followed-back" type on the target sharing interface reaches a preset display frequency threshold, replacing the candidate sharer based on other "to-be-followed-back" users when the target sharing interface is displayed again.

According to one or more embodiments of the present disclosure, [Example 14] provides a data processing apparatus, including:
a display information determination module for, if it is detected that an operation behavior on a target display page is a sharing operation behavior, determining target display information of at least one candidate sharer; wherein, the user types corresponding to the at least one candidate sharer include a "to-be-followed-back" type;
a display interface determination module for, based on the target display information, displaying the at least one candidate sharer on a target sharing interface corresponding to the target display page.

The above description is only preferred embodiments of the present disclosure and an explanation of the applied technical principles. Those skilled in the art should understand that the scope of disclosure involved in this disclosure is not limited to the technical solutions formed by the specific combination of the above technical features, and should also cover other technical solutions formed by any combination of the above technical features or their equivalent features without departing from the disclosed concept. For example, technical solutions formed by replacing the above features with technical features having similar functions to those disclosed in the present disclosure (but is not limited thereto).

In addition, although the operations are depicted in a specific order, this should not be understood as requiring these operations to be performed in the specific order shown or performed in a sequential order. Under certain circumstances, multitasking and parallel processing may be advantageous. Likewise, although several specific implementation details are included in the above discussion, these should not be construed as limiting the scope of the present disclosure. Certain features that are described in the context of separate embodiments can also be implemented in combination in a single embodiment. Conversely, various features described in the context of a single embodiment can also be implemented in multiple embodiments individually or in any suitable sub-combination.

Although the subject matter has been described in language specific to structural features and/or logical actions of the method, it should be understood that the subject matter defined in the appended claims is not necessarily limited to the specific features or actions described above. On the contrary, the specific features and actions described above are merely exemplary forms for implementing the claims.

What is claimed is:

1. A data processing method, comprising:
detecting that an operation behavior on a target display page performed by a first user is a sharing operation behavior;
determining target display information of at least one candidate sharer, in response to detecting that the operation behavior on the target display page is the sharing operation behavior, user types corresponding to the at least one candidate sharer including a "to-be-followed-back" type, and a candidate sharer of the "to-be-followed-back" type including a second user who is a follower of the first user, but is not followed back by the first user; and
displaying the at least one candidate sharer on a target sharing interface corresponding to the target display page based on the target display information.

2. The method according to claim 1, further comprising:
determining whether a first user number of mutuals associated with a target client is less than a number threshold, the mutuals corresponding to a mutual type;
determining at least one "to-be-followed-back" user according to the first user number of mutuals and the number threshold, in response to determining that the first user number of mutuals is less than the number threshold, the at least one "to-be-followed-back" user corresponding to a "to-be-followed-back" type; and
determining the at least one candidate sharer based on the "to-be-followed-back" users and the mutuals.

3. The method according to claim 1, wherein the sharing operation behavior includes at least one of:
a first sharing operation behavior of clicking a share control; and
a second sharing operation behavior of pressing at a target area for a time period.

4. The method according to claim 3, wherein determining the target display information of the at least one candidate sharer, in response to detecting that the operation behavior on the target display page is the sharing operation behavior comprises:
determining a display avatar and a user name of the at least one candidate sharer, as well as first layout information of the display avatar on the target sharing interface, in response to detecting that the operation behavior on the target display page is the first sharing operation behavior; and
determining the target display information based on the first layout information, the display avatar and the user name.

5. The method according to claim 4, wherein displaying the at least one candidate sharer on the target sharing interface corresponding to the target display page based on the target display information comprises:
displaying the display avatar and user name of each candidate sharer on the target sharing interface corresponding to the target display page according to the first layout information.

6. The method according to claim 5, wherein the first layout information and the second layout information include display order information of the at least one candidate sharer; and
wherein, the display order of the mutual type is prior to the display order of the "to-be-followed-back" type.

7. The method according to claim 3, wherein determining the target display information of the at least one candidate sharer, in response to detecting that the operation behavior on the target display page is the sharing operation behavior comprises:
determining user types of the candidate sharers, and determining target display information of corresponding candidate sharers based on their user types, in response to detecting that the operation behavior on the target display page is the second sharing operation behavior,
wherein, the target user types include a mutual type and a "to-be-followed-back" type.

8. The method according to claim 7, wherein determining the target display information of the corresponding candidate sharers based on their user types comprises:
for a first corresponding candidate sharer whose user type is the mutual type, determining a first display avatar of the first corresponding candidate sharer;
for a second corresponding candidate sharer whose user type is the "to-be-followed-back" type, determining a second display avatar and a display source of the second corresponding candidate sharer;
determining second layout information of the at least one candidate sharer on the target sharing interface; and
determining target display information of the corresponding candidate sharers based at least on the second layout information, the first display avatar, and the second display avatar and the display source.

9. The method according to claim 8, wherein displaying the at least one candidate sharer on the target sharing interface corresponding to the target display page based on the target display information comprises:
displaying display avatars of the candidate sharers whose user type is the mutual type, and display avatars and display sources of the candidate sharers whose user type is the "to-be-followed-back" type on the target sharing interface corresponding to the target display page according to the second layout information,
wherein, the target sharing interface includes a type control corresponding to the user type.

10. The method according to claim 3, wherein the target sharing interface is generated based on the first sharing operation behavior, and the method further comprising:
determining the target sharers and target user types of the target sharers according to a trigger operation for the at least one candidate sharer;
in response to determining that the target user types are consistent with the "to-be-followed-back" type, popping up a first display interface, wherein the first display interface includes target sharers of the "to-be-followed-back" type; and
sending target data for sharing corresponding to the target display page to the corresponding target sharers based on a trigger operation on the first display interface.

11. The method according to claim 10, wherein sending the target data for sharing corresponding to the target display page to the corresponding target sharers based on the trigger operation on the first display interface comprises:
sending the target data for sharing to the corresponding target sharers, and then displaying the target display page again, wherein the trigger operation on the first display interface is the trigger operation for a Follow Back and Share control on the first display interface.

12. The method according to claim 3, wherein the target sharing interface is generated based on the second sharing operation behavior, and the method further comprising:
detecting that a "to-be-followed-back" type control is triggered;
following back a corresponding target sharer; and
sending the target data for sharing corresponding to the target display page to the target sharer.

13. The method according to claim 1, further comprising:
determining that the display frequency of a candidate sharer of the "to-be-followed-back" type on the target sharing interface reaches a display frequency threshold; and
replacing the candidate sharer based on other "to-be-followed-back" users when the target sharing interface is displayed again.

14. A non-transitory storage medium containing computer executable instructions for executing a data processing method when executed by a computer processor, the data processing method comprising:
detecting that an operation behavior on a target display page performed by a first user is a sharing operation behavior;
determining target display information of at least one candidate sharer, in response to detecting that the operation behavior on the target display page is the sharing operation behavior, user types corresponding to the at least one candidate sharer including a "to-be-followed-back" type, and a candidate sharer of the "to-be-followed-back" type including a second user who is a follower of the first user, but is not followed back by the first user; and
displaying the at least one candidate sharer on a target sharing interface corresponding to the target display page based on the target display information.

15. An electronic device, the electronic device comprising:
one or more processors;
a storage device for storing one or more programs, which when executed by the one or more processors, cause the one or more processors to:
detect that an operation behavior on a target display page performed by a first user is a sharing operation behavior;
determine target display information of at least one candidate sharer, in response to detecting that the operation behavior on the target display page is the sharing operation behavior, user types corresponding to the at least one candidate sharer including a "to-be-followed-back" type, and a candidate sharer of the "to-be-followed-back" type including a second user who is a follower of the first user, but is not followed back by the first user; and
display the at least one candidate sharer on a target sharing interface corresponding to the target display page based on the target display information.

* * * * *